United States Patent [19]

Wickert

[11] Patent Number: 5,066,705

[45] Date of Patent: Nov. 19, 1991

[54] AMBIENT CURE PROTECTIVE COATINGS FOR PLASTIC SUBSTRATES

[75] Inventor: Frank A. Wickert, Olmsted Township, Cuyahoga County, Ohio

[73] Assignee: The Glidden Company, Cleveland, Ohio

[21] Appl. No.: 466,679

[22] Filed: Jan. 17, 1990

[51] Int. Cl.$^5$ .............................................. C08G 18/72
[52] U.S. Cl. ................................. 524/457; 428/411.1; 524/460; 524/832
[58] Field of Search .................... 428/411.1; 524/832, 524/457, 460

Primary Examiner—Maurice J. Welsh
Assistant Examiner—Rachel Johnson
Attorney, Agent, or Firm—Thomas M. Schmitz

[57] ABSTRACT

A water-dispersed protective coating composition contains a coreactive binder comprising a polycarbodiimide adapted to crosslink with a carboxyl functional emulsion copolymer and polyurethane. The coating is applied to plastic substrates and ambiently cured or with mild heat.

12 Claims, No Drawings

AMBIENT CURE PROTECTIVE COATINGS FOR PLASTIC SUBSTRATES

This invention pertains to aqueous dispersed thermosetting coatings and more particularly to a polymeric binder mixture of water-dispersed polyurethane and an emulsion polymerized acrylic copolymer where both polymers contain functionally reactive groups adapted to be crosslinked with carbodiimide crosslinkers. The coatings are particularly useful as a protective coating for plastic substrates.

BACKGROUND OF THE INVENTION

Protective surface coatings are commonly known as paint coatings. Clear and pigmented surface coatings are organic compositions applied to substrates to form continuous films which are cured or otherwise hardened to provide protection as well as a decorative appearance to the substrate. Pigmented protective surface coatings ordinarily comprise an organic polymeric binder, pigments, inert fillers and other additives. The polymeric binder functions as a vehicle for the pigments, inerts, and other additives in wet coating compositions and further functions as a crosslinked binder for the pigments and inert fillers in the cured or hardened paint film. In aqueous coating systems, the prime pigments and inert fillers are normally dispersed in water with wetting and dispersing agents that are suited for the purpose. A protective colloid (e.g. hydroxyethyl cellulose, polyvinyl alcohol, etc.) is usually added to provide a steric stabilization for the dispersed pigments. The aqueous pigment dispersion is then combined with waterborne polymers that bind the pigments and inert fillers in the cured or hardened paint film. The thermosetting polymeric binders of this invention comprise thermosetting functional polymers coreactive with carbodiimide crosslinkers. Carboxyl functional latex resins crosslinked by polycarbodiimides are disclosed in European Patent Application Publication No. 0,121,083 published Oct. 10, 1984 based on Application No. 84101921.9 filed Feb. 23, 1984. Water-dispersed polyurethanes are disclosed in U.S. Pat. Nos. 4,335,029; 3,826,769; 4,305,858; 4,306,998; 4,147,680; 4,211,683; and 4,408,008.

It now has been found that aqueous thermosetting coatings based on water-dispersed polyurethane and emulsion polymeric acrylic polymers can be adapted to be crosslinked at ambient temperatures with carbodiimide crosslinkers where such thermosetting compositions are particularly suitable for application and adhesion to temperature sensitive plastic substrates. The cured paint films exhibit excellent flexibility and adhesion as well as solvent and water resistance over several types of plastic substrates. The waterborne polymers of this invention include emulsion copolymers and polyurethane dispersions that form a continuous film via a coalescence and thermosetting process at ambient or mild force dry conditions. In these systems, the filming process is initiated by the evaporation of water. Film properties are further enhanced by the post addition of a carbodiimide crosslinker that is coreactive with carboxyl functional sites on the emulsion copolymer and polyurethane polymers. The reaction between carbodiimides and carboxyl functional polymers to form polymeric N-acyl ureas occurs at room temperature in most systems, or at mild bake temperatures that are well below the heat distortion temperatures of most plastics in others. The water-dispersed polyurethane is included in the polymeric mixture to enhance the hardness/flexibility and resistance properties of the coating. The emulsion copolymer provides good adhesion to a wide variety of plastic substrates. Both polymers contain functional groups that react with carbodiimide crosslinkers under forced dry or ambient conditions to provide further enhancement of resistance properties. Waterborne clear and pigmented coating systems that utilize this polymer matrix as a binder have been developed. The polymer matrix is particularly useful in primer coatings for plastic substrates. These and other advantages of this invention will become apparent by referring to the detailed description and illustrative examples of the invention.

SUMMARY OF THE INVENTION

Briefly, the invention pertains to aqueous dispersed thermosetting coating compositions based on a coreactive polymeric binder comprising an aqueous mixture of water-dispersed polyurethane polymer and emulsion copolymer of ethylenic monomers copolymerized in water. The polyurethane and emulsion polymer both contain functionally reactive groups adapted to coreact with a carbodiimide crosslinker.

DETAILED DESCRIPTION OF THE INVENTION

The thermosetting coating composition is based on a polymeric binder comprising a water-dispersed carboxyl functional polyurethane and carboxyl functional emulsion polymer, where both polymers are adapted to be crosslinked by a carbodiimide crosslinker.

Carboxyl functional polyurethane polymers contain carbamate (urethane) groups in the polymer backbone as well as terminal or pendant carboxyl groups. Polyurethane conventionally are formed by coreaction of a diisocyanate with a hydroxyl-functional oligomer such as a polyester or polyether or polyalkyl oxide, which can be further reacted with a short-chain glycol extender if desired. In accordance with this invention, excess equivalents of diisocyanate are reacted with lesser equivalent of hydroxyl functional oligomer and glycol to provide an isocyanate terminated prepolymer adapted to be further reacted with a carboxyl functional coreactant to produce a carboxyl terminated or pendant polyurethane polymer. The Acid No. of the polyurethane should be between about 20 and 100. Suitable diisocyanates include toluene diisocyanate isomers (TDI), polymeric isocyanate (PMDI), 4,4'-methylenebis (phenyl isocyanate) or (MDI), isophorone diisocyanate (IPDI), hexamethylene diisocyanate, trimethylhexamethylene diisocyanate (TMDI), methylenebis (cyclohexyl isocyanate) and similar aromatic or aliphatic diisocyanates, as well as minor amounts of trifunctional isocyanates such as trimerized isophorone isocyanate or biuret of hexamethylene diisocyanate. Useful commercial polyether polyols include polyethylene glycol, polypropylene glycol, polytetramethylene glycol, and various polyol adducts of propylene or ethylene oxide. Useful polyester polyols are low molecular weight polymers or oligomers comprising reaction products of excess equivalents of glycol with lesser equivalents of dicarboxyl aliphatic acid. Typical polyester include ethylene, propylene, or butane glycol reacted with adipic acid. Useful extender glycols, if desired, include ethylene glycol, diethylene glycol, triethylene glycol, propylene glycol, dipropylene glycol, butylene glycols, and similar lower aliphatic glycols as well as minor amounts of polyols such as trimethylol propane. The isocyanate terminated prepolymer should have a number average molecular weight measured by GPC between about 500 and 5000. Functional carboxyl reactants are carboxyl compounds containing functional groups such as hydroxy or amine groups, preferably primary functional groups, adapted to react with isocyanate groups in preference to the carboxyl group. Coreactants adapted to coreact with excess unreacted isocyanate groups on the prepolymer include hydroxyl or amine functional carboxyl compounds such as dimethylol propionic acid or carboxyl functional polyester comprising excess equivalents of dicarboxylic acid reacted with lesser equivalents of glycol. The resulting polymer is a carboxyl functional polyurethane having a number average molecular weight above about 100,000 as measured by GPC. The Acid No. is broadly between 20 and 100 but preferably between 25 and 60.

In accordance with this invention, the carboxyl functional polyurethane is produced by dispersing the hydroxyl oligomer, diisocyanate, extender glycol if desired, into an organic solvent followed by coreaction of the reactive components. Useful organic solvents include for instance, acetone, methyl ethyl ketone, butyl cellosolve and similar lower alcohols, ketones, and hydrocarbon solvent. The foregoing components preferably are reacted to form the isocyanate terminated polymer followed by further reaction with a functional carboxyl compound to produce a carboxyl functional polyurethane. Alternatively, all components including the functional carboxyl compounds can be copolymerized simultaneously. The polyurethane reaction can be catalyzed with a catalyst such as dibutyl tin dilaurate at temperature between about 20° C. and 120° C. but preferably around 50° C. to 70° C.

Tertiary amine such as dimethylethanol amine can be added to the finished polyurethane polymer at about room temperature to convert the carboxyl functional polyurethane to an aqueous suspension. The polyurethane polymer is dispersed in water, using a fugitive base (under curing conditions for the coating) such as primary, secondary, and tertiary alkyl, alkanol, and aromatic amines and alkanol-alkyl mixed amines; e.g., monoethanolamine, dimethylethanolamine, triethylamine, dimethylaniline, ammonium hydroxide, or the like. Ordinarily, this is done by adding the amine with some deionized water to the resinous blend and mixing vigorously while (optionally) warming, then diluting the reaction mixture with more deionized water as is desired. Equivalent ratios of amine to acid functionality in the polyurethane dispersion can be about 0.5:1 to 1.5:1. A small amount of an inverting solvent such as butyl cellosolve can also be added before inversion at a 0 to 10% level if desired. Inversion into water is accomplished by adding water to the amine neutralized polyurethane prepolymer solution to give a solids level of about 20% to 75% but preferably 33% to 36% based on total polyurethane solids content. The resulting composition is a water-dispersed carboxyl functional polymer.

Referring now to the emulsion copolymer, the copolymer comprises copolymerized ethylenically unsaturated monomers. Useful ethylenic monomers include unsaturated monomers containing carbon-to-carbon unsaturation such as vinyl monomers, acrylic monomers, allylic monomers, acrylamide monomers, and mono- and dicarboxylic unsaturated acids. In accordance with this invention, the ethylenic monomers comprise on a weight basis between about 3% and 60% acrylic monomer, between 1% and 15% acrylic acid monomer, with the balance being other ethylenically unsaturated monomers. The Acid No. of the emulsion polymer can be between 20 and 100 but preferably between 25 and 60.

Acrylic monomers include monomers such as lower alkyl esters of acrylic or methacrylic acid having an alkyl ester portion containing between to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Acrylic acids include acrylic and methacrylic acid, ethacrylic acid, alpha-chloroacrylic acid, alpha-cyanoacrylic acid, crotonic acid, beta-acryloxy propionic acid, and beta-styryl acrylic acid. Other ethylenic monomers include vinyl esters which include vinyl acetate, vinyl propionate, vinyl butyrates, vinyl benzoates, vinyl isopropyl acetates and similar vinyl esters; vinyl halides which include vinyl chloride, vinyl fluoride, and vinylidene chloride; vinyl aromatic hydrocarbons include styrene, methyl styrenes and similar lower alkyl styrenes, chlorostyrene, vinyl toluene, vinyl naphthalene, and divinyl benzene; vinyl aliphatic hydrocarbon monomers include alpha olefins such as ethylene, propylene, isobutylene, and cyclohexyl as well as conjugated dienes such as 1,3-butadiene, methyl-2-butadiene, 1,3-piperylene, 2,3-dimethyl butadiene, isoprene, cyclohexane, cyclopentadiene, and dicyclopentadiene; vinyl alkyl ethers include methyl vinyl ether, isopropyl vinyl ether, n-butyl vinyl ether, and isobutyl vinyl ether; and acrylamide monomers which include acrylamides or methacrylamides as well as N-methylol acrylamide, N-ethanol acrylamide, N-propanol acrylamide, N-methylol methacrylamide, N-ethanol methacrylamide, and similar alkyl acrylamide or methacrylamide monomers containing methyl, ethyl, propyl, n-butyl or isobutyl alkyl groups.

The unsaturated monomers are copolymerized in the aqueous polymerization medium containing surfactants and polymerizing catalysts or initiators as well as other emulsion polymerization ingredients. Initiators can include for example, typical free radical and redox types such as hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, dimethylazobis-isobutyrate, ammonium persulfate, sodium persulfate, potassium persulfate, sodium perphosphate, potassium perphosphate, isopropyl peroxycarbonate, and redox initiators such as sodium persulfate-sodium formaldehyde sulfoxylate, cumene hydroperoxide-sodium metabisulfite, potassium persulfate-sodium bisulfite, cumene hydroperoxide-iron (II) sulfate, etc. The polymerization initiators are usually added in amounts between about 0.1 to 2 weight percent based on the monomer additions. Suitable anionic surfactants include for example, salts of fatty acids such as sodium and potassium salts of steric, palmetic, oleic, lauric, and tall oil acids, salts of sulfated fatty alcohols, salts of phosphoric acid esters of polyethylated long chain alcohols and phenols, etc. Preferred anionic surfactants include for example, alkylbenzene sulfonate salts such as sodium dodecylbenzene sulfonate and salts of hexyl, octyl, and higher alkyl diesters of 2-sulfosuccinic acid, etc. Suitable non-ionic surfactants include polyoxyethylene glycols reacted to a lyophilic compound. Suitable non-ionic surfactants include for example, ethylene oxide condensation products reacted with t-octylphenol or nonylphenyl, polymerized oxyethylene, ethylene oxide reacted with organic acid, or organic acid reacted with polyoxyamylene ether of steric or oleic acid esters.

For best results, the acid numbers of the emulsion copolymer and urethane dispersion should be between 25 and 60 although the workable range is between 20 and 100. A coating system that has the desired adhesion and resistance properties would contain a polymer matrix that consists of (i.e. on a volume solids basis) between 50% and 80% emulsion copolymer, and between 20% and 50% water-dispersed polyurethane. The carbodiimide crosslinker is post added to the system at a level of 2.0% to 10% solid carbodiimide based on the emulsion copolymer and polyurethane solids by weight or volume.

Higher emulsion copolymer levels will enhance coating adhesion to most plastic substrates, but reduce resistance properties. Higher levels of water-dispersed polyurethane will produce effects that are opposite those of the emulsion copolymers. Higher levels of carbodiimide and high bake temperatures will generally improve coating resistance properties at all blend ratios. These results will vary slightly from one polymer blend to another, and from one type of plastic substrate to another.

Referring next to carbodiimide crosslinkers, carbodiimides generally comprise aliphatic or aromatic dinitrogen analogue of carbonic acid of the generalized structure:

$$RN=C=NR_1$$

where $R_1$ and $R_2$ individually can be $H_1$ aliphatic or aromatic. Aliphatic groups comprise alkyl chains containing between 1 and 20 carbon atoms and preferably between 6 and 15 carbon atoms. Useful carbodiimides include for instance dicyclohexyl carbodiimide. Emulsified or water soluble polyfunctional carbodiimides can comprise the reaction product of mono-, di-, or tri- cycloaliphatic or saturated aliphatic isocyanate where diisocyanates are preferred. The cycloaliphatic structure can contain 5 to 7 carbons and can be substituted with alkyl groups having 1 to 6 carbons and oxygen while the saturated aliphatic structures can contain 1 to about 18 carbons. A detailed description of the preparation of polycarbodiimides is set forth in European Patent Application publication No. 0 121 083 published Oct. 10, 1984 further identified as application no. 84101921.9 filed Feb. 23, 1984, and the same is incorporated herein by reference. Other useful polycarbodiimides are shown in European Patent 277-361 and the same is incorporated by reference. The polycarbodiimide can be dispersed into water by using a surfactant such as sodium dialkyl sulfosuccinate. Alternatively, a water soluble polycarbodiimide can be prepared by reacting minor amounts of an amine such as dimethyl aminopropylamine and an alkyl sulfonate or sulfate into the carbodiimide structure as proposed in said EP publication No. 0121 083.

On a volume solids percentage basis, the thermosetting binder composition comprises between 2% and 10% carbodiimide crosslinker added to a polymeric composition containing between 50% and 80% emulsion copolymer of copolymerized monomers, and between 20% and 50% water-dispersed polyurethane.

The manufacture of thermosetting paint coatings in accordance with this invention involves the preparation of an emulsion copolymer pre-mix and pigment dispersion phase that are carried out in separate vessels. The emulsion copolymer is normally added to a letdown tank where it is treated with coalescing solvents and plasticizers. The coalescing solvents and plasticizers are normally given a minimum of 4 hours, and preferably 24 hours, to sweat into the polymer phase of the emulsion before it is combined with the other components of the system. This procedure insures proper film formation of the emulsion copolymer at ambient and low bake conditions. If the polyurethane dispersion is combined with the emulsion copolymer before this sweat-in process has advanced sufficiently, a competition for the available filming aids can seriously affect the performance characteristics of both polymers. Sweat-in times will vary with emulsion copolymer, polyurethane, and filming aid types.

The pigment dispersion is prepared in a dish bottomed tank that is fitted with a high speed disperser or dissolver. Distilled or deionized water is used as the dispersing medium, and pigment dispersion is facilitated by the addition of a special high acid no. colloidal dispersing acrylic resin. The acrylic dispersion agent can be a low molecular weight acrylic copolymer of copolymerized ethylenic monomers previously described including an acrylic acid monomer to produce an acrylic dispersant having an Acid No. above about 80 and between 80 and 150. In these systems, the acrylic dispersing agent has been found to be reactive with the carbodiimide crosslinker thereby eliminating the water sensitivity problems that normally accompany the addition of high levels of dispersing aid to a waterborne coating system. A portion of the polyurethane dispersion can be included in the dispersion phase of higher solids coating systems where the available water levels are inadequate for proper dispersion of the pigment load. After the dispersion has been completed, the pigment grind is thinned with the remainder of the polyurethane dispersion and pumped to the letdown tank where it is combined with the emulsion copolymer to form a homogeneous coating blend. A small addition of tertiary amine and/or protective colloid is sometimes needed for viscosity adjustment and package stability.

High speed dispersers or dissolvers are used in the grinding step to intersperse the pigments into the polymeric binder. The binder and pigment grind can be thoroughly and uniformly mixed with raw batch ingredients by homogenizing the binders, pigmentary solids, plasticizers and other components to form a uniform blend. The polymeric binder physically wets the titanium dioxide pigment surface and further maintains the pigment in stable dispersion. Pigments ordinarily include opacifying pigments such as titanium dioxide, zinc oxide, leaded zinc oxide, titanium calcium, as well as tinting pigments such as carbon black, yellow oxides, brown oxides, tan oxides, raw and burnt sienna or umber, chromium oxide green, phthalocyanine green, phthalonitrile blue, ultramarine blue, cadmium pigments, chromium pigments, and the like. Filler pigments such as clay, silica, talc, mica, wollastonite, wood flower and the like can be added. Prime pigments can also be added to the system in the form of a pre-dispersion or shading paste as long as such materials are compatible with the chosen binders. In this case, as well as in the case of the preparation of clear coatings, the dispersion step is eliminated, and the coating blend is prepared entirely in a letdown tank. Clear and pigmented coatings are typically formulated between 20% and 40% solids by volume. Pigmented coatings of this type are usually formulated between 5 and 45 PVC depending upon the application requirements. The $TiO_2$ PVC of these coatings will vary between 1% and 25% depending upon hiding and tint strength requirements. Ordinarily the carbodiimide crosslinker is not added until use. The paint coating can be applied to substrates and plastic substrates especially, and then cured at ambient temperatures or above for time sufficient to crosslink the carbodiimide with both the emulsion polymer and water-dispersed polyurethane polymer.

In accordance with this invention, an ambient cure, thermosetting, paint composition that is particularly useful for plastic substrates such as SMC, PVC, Modar and polycarbonates has been developed. In a preferred aspect of this invention, the ambient cured coating is supplied in an uncrosslinked state, and the dicarbodiimide crosslinker is post added to the primer prior to application. The resulting product typically has a pot life of approximately 24 hours. Deterioration of the crosslinker is by a hydrolysis process, but since the hydrolysis process does not affect the stability of the primer, a primer that has been activated with crosslinker may be re-used by simply adding more crosslinker.

The thermosetting coating composition of this invention has excellent adhesion to the plastic substrate and produces unusual solvent and water-resistant properties. The primer is applied by conventional airless spray and is designed to be topcoated with conventional air dry trade sales waterborne or solvent-borne finishes.

The merits of this invention is further illustrated by the following examples.

EXAMPLE 1

A paint coating composition was made from the following components:

| Component | lbs./100 gal. | % NV/Vol. |
|---|---|---|
| Aliphatic Polyurethane, Acid No. = 30 | 236 | 8.58 |
| Thermoplastic acrylic emulsion polymer Acid No. = 33 | 289 | 13.07 |
| Acrylic dispersing agent, Acid No. = 100 | 19.5 | 1.12 |
| Titanium dioxide | 146 | 4.27 |
| talc | 175 | 7.78 |
| Aromatic polycarbodiimide (Ucarlnk XL-255e) | 22 | 1.28 |
|  |  | 36.10 |

| Paint pigment-volume-content (PVC) = 33.3% | |
|---|---|
| Binder composition | Vol. Solids |
| Polyurethane | 37.68% |
| Acrylic copolymer | 57.40% |
| Acrylic dispersant | 4.92% |
| Polycarbodiimide | 5.62% |

EXAMPLE 2

Paint coatings similar to Example 1 were tested at various levels of carbodiimide crosslinker as follows. Several samples of paint coatings were formulated at 36% V.N.V., 33% PVC at a 60:40 volume solids ratio of acrylic copolymer to polyurethane which were tested with polycarbodiimide at levels ranging from 0% to 10% solids carbodiimide based on polymer solids of polyurethane and acrylic copolymer. The resulting compositions were applied with a No. 31. wire rod (DFT=ca 0.8 mils) to PVC plastic panels. Other samples were applied by conventional air spray to wood grain embossed Modar plastic doorskin plaques. The coated PVC plastic panels were ambient cured at about 70° F. and other heat cured at 150° F. for 20 minutes. The Modar panels were cured at 150° F. only. The solvent and water resistance of the cured paint film were calculated using MEK double rubs and Cleveland Condensing Humidity at 140° F. respectively. The results are recorded in Table 1.

TABLE 1

| On P.V.C. | | | | | | |
|---|---|---|---|---|---|---|
| % CDA X-Linker | 0 | 2 | 4 | 6 | 8 | 10 |
| M.E.K. rubs (air dry) | 5 | 8 | 10 | 20 | 30 | 40 |
| M.E.K. rubs (bake) | 12 | 15 | 25 | 35 | 100 | 160 |
| 1 wk. CCH (Air dry) | N.F. | N.F. | N.F. | N.F. | N.F. | N.F. |
| 1 wk. CCH (Bake) | N.F. | N.F. | N.F. | N.F. | N.F. | N.F. |

Key:
N.F. - Exposure to the CCH conditions produced no visible Film Failures in the form of blistering or adhesion loss. However, a thumbnail evaluation of the exposed films indicated reduced film softening, and improved adhesion with increasing C.D.A. content.

| On Modar Doorskins | | | | | | |
|---|---|---|---|---|---|---|
| % CDA X-linker | 0 | 2 | 4 | 6 | 8 | 10 |
| MEK Rubs (Bake) | 10 | 15 | 25 | 25 | 50 | 60 |
| 1 wk. CCH (Bake) | No. 8/Med. | | No. 8/few | | N.F. | N.F. |

Key:
No. 8/Med. - ASTM Blister Standard
No. 8 - blister size/Med. - density of the blisters.

We claim:
1. An aqueous dispersed, thermosetting, protective coating composition for application to a plastic substrate, the coating composition containing a thermosetting polymeric binder comprising on a volume solids basis:
between 50% and 80% an emulsion copolymer comprising copolymerized ethylenically unsaturated monomers including a carboxyl functional monomer, said emulsion copolymer having an Acid No. between 20 and 100, and between 20% and 50% of a water-dispersed carboxyl functional polyurethane having an Acid No. between 20 and 100; and from 2% to 10% volume solids of polycarbodiimide based on the volume solids of said emulsion copolymer and said polyurethane.

2. An aqueous dispersed, thermosetting, protective coating composition applied to a plastic substrate, the coating composition containing a thermosetting polymeric binder comprising on a volume solids bases:
between 50% and 80% an emulsion copolymer comprising copolymerized ethylenically unsaturated monomers including a carboxyl functional monomer, said emulsion copolymer having an Acid No.

between 20 and 100, and between 20% and 50% of a water-dispersed carboxyl functional polyurethane having an Acid No. between 20 and 100;

from 2% to 10% volume solids of polycarbodiimide based on the volume solids of said emulsion copolymer and said polyurethane; and where the coating applied to the plastic substrate is cured to crosslink the carbodiimide with the polyurethane and the emulsion copolymer.

3. The coating composition in claim 2 where the carboxyl functional polyurethane has a number average molecular weight above about 100,000.

4. The coating composition in claim 2 where the emulsion copolymer comprises copolymerized monomers on a weight basis between 3% and 60% acrylic monomer, between 1% and 15% of an acrylic acid monomer, with the balance being other ethylenic monomers.

5. The coating composition in claim 2 containing pigment to provide a pigment-volume-content (PVC) between 5 and 45 PVC.

6. The coating composition in claim 5 containing an acrylic resin pigment dispersant having an Acid No. above about 80.

7. The coating composition in claim 2 where the polycarbodiimide crosslinker is an aliphatic dicarbodiimide.

8. The coating composition in claim 1 where the polycarbodiimide is an aromatic dicarbodiimide.

9. The coating composition in claim 2 where the aromatic dicarbodiimide is dicyclohexyl carbodiimide.

10. The coating composition in claim 1 where the polycarbodiimide crosslinker is an aliphatic dicarbodiimide.

11. The coating composition in claim 1 where the polycarbodiimide is an aromatic dicarbodiimide.

12. The coating composition in claim 8 where the aromatic dicarbodiimide is dicyclohexyl carbodiimide.

* * * * *